United States Patent
Nanba

(10) Patent No.: US 8,107,171 B2
(45) Date of Patent: Jan. 31, 2012

(54) ZOOM LENS SYSTEM AND IMAGE PICKUP APPARATUS INCLUDING THE SAME

(75) Inventor: Norihiro Nanba, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/872,382

(22) Filed: Aug. 31, 2010

(65) Prior Publication Data

US 2011/0080650 A1   Apr. 7, 2011

(30) Foreign Application Priority Data

Oct. 1, 2009   (JP) ................. 2009-229351

(51) Int. Cl.
   *G02B 15/14*   (2006.01)

(52) U.S. Cl. ........................ 359/683; 359/676
(58) Field of Classification Search .................. 359/676, 359/680–682, 683
   See application file for complete search history.

(56) References Cited

U.S. PATENT DOCUMENTS

| 6,388,818 | B1* | 5/2002 | Tochigi | ............ 359/687 |
| 7,679,837 | B2 | 3/2010 | Souma | |
| 7,830,612 | B2* | 11/2010 | Hagiwara | ............ 359/676 |

FOREIGN PATENT DOCUMENTS

JP   2003-287681 A   10/2003

* cited by examiner

*Primary Examiner* — James Greece
(74) *Attorney, Agent, or Firm* — Rossi, Kimms & McDowell LLP

(57) ABSTRACT

A zoom lens system comprises, from an object to an image side: a first, a second, a third, a fourth, and a fifth lens units, wherein all units move during zooming so that an interval between the first and second lens units is larger, an interval between the second and third lens units is smaller, an interval between the fourth and fifth lens units is larger, at a telephoto end than those at a wide angle end, and an interval between the third and fourth lens units varies; and a focal length of the second lens unit, a focal length of an entire system at the wide angle end, a movement amount of the fourth lens unit in zooming from wide angle end to telephoto end, and intervals between the third and fourth lens units at the wide angle end and at the telephoto end are set appropriately.

9 Claims, 11 Drawing Sheets

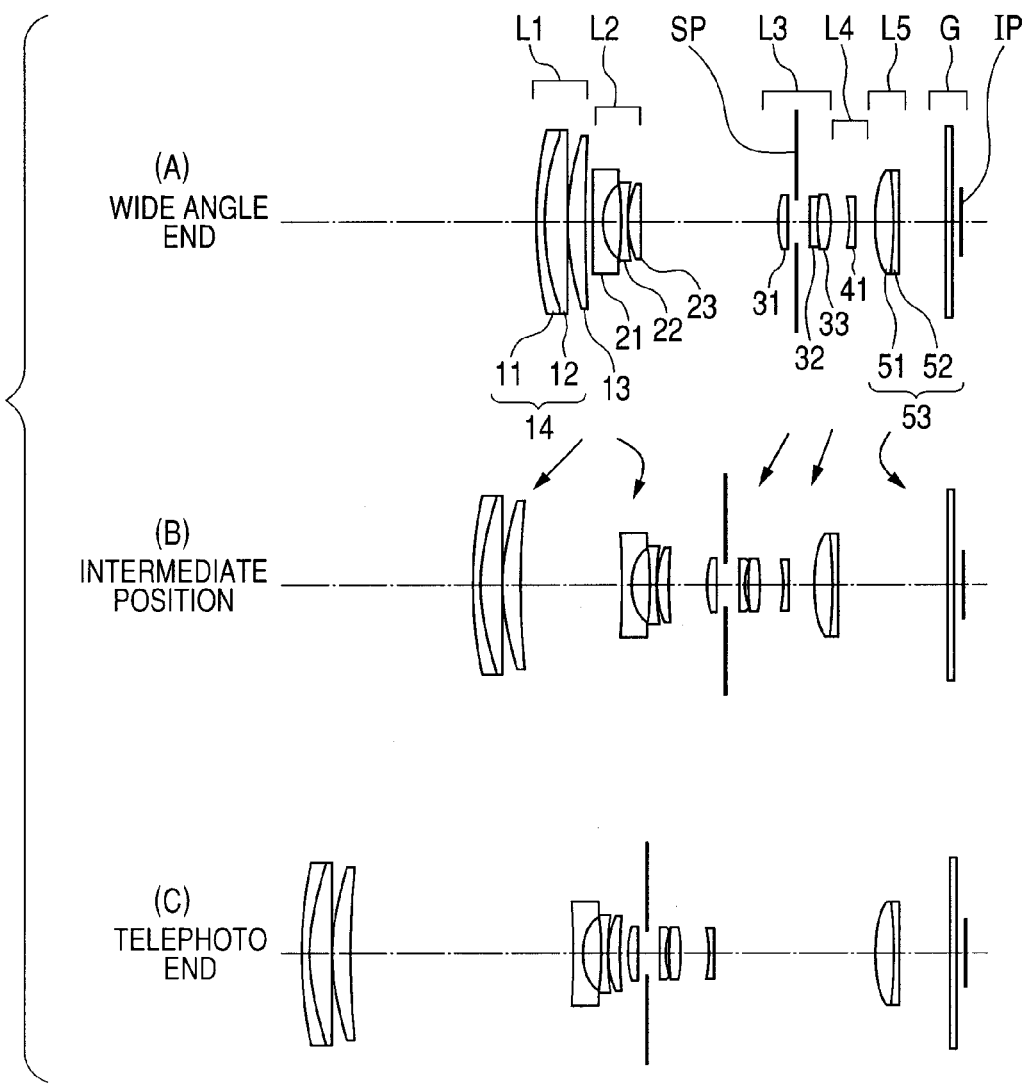

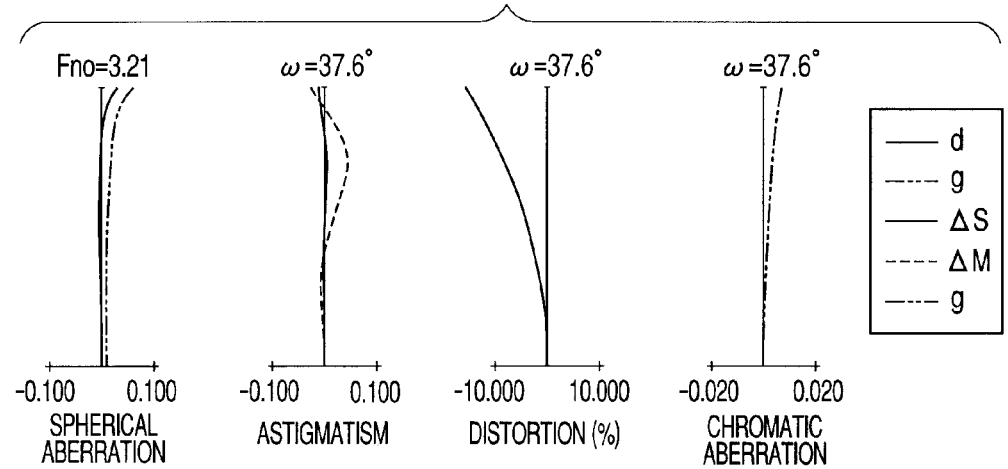
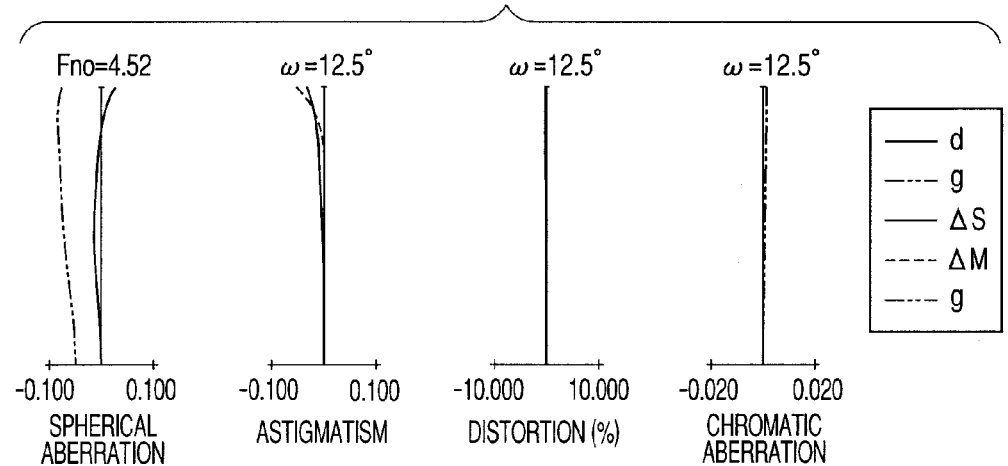
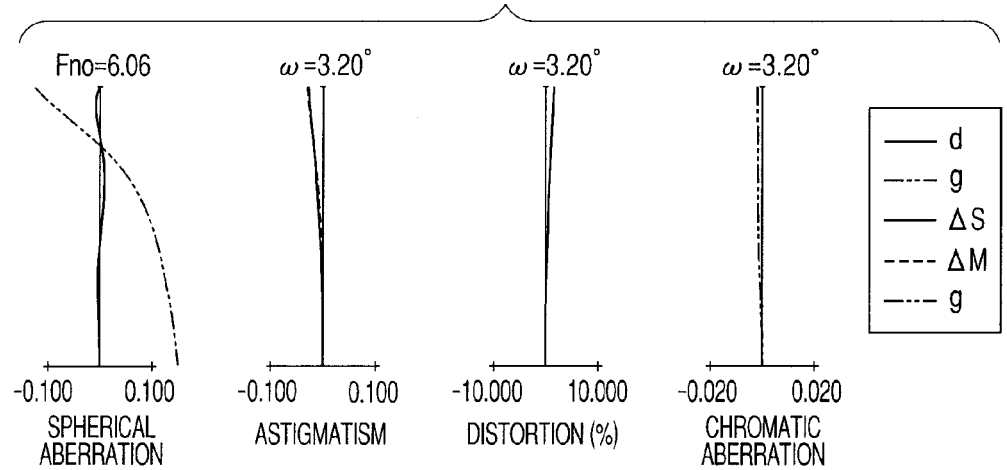

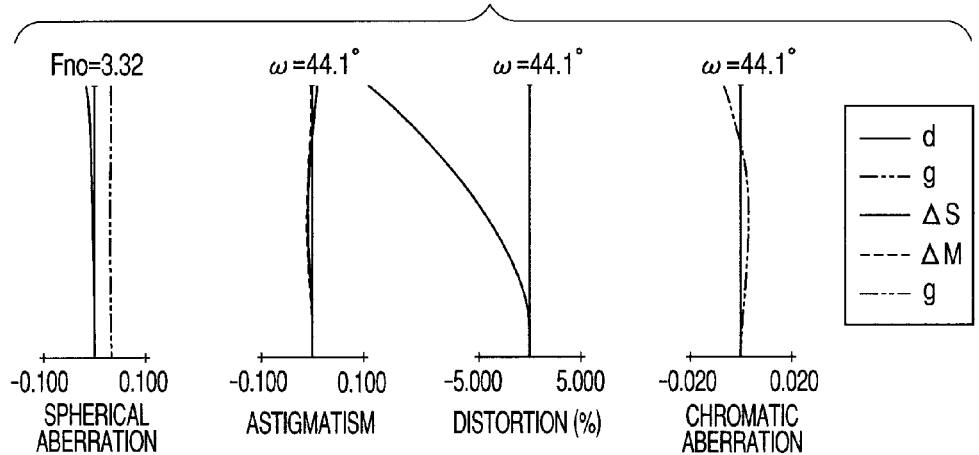
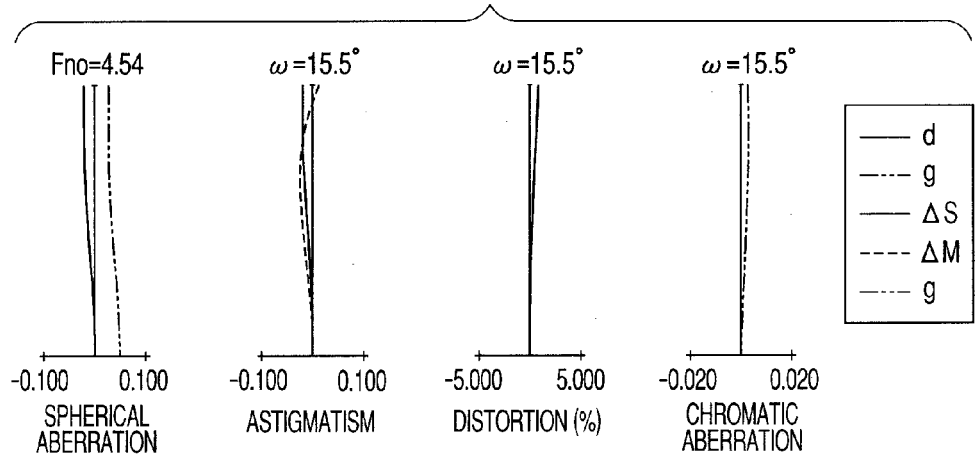
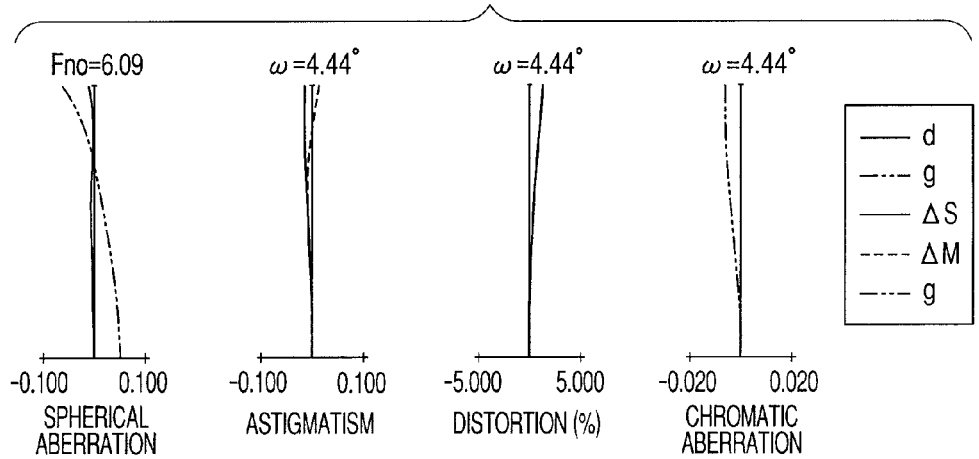

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the zoom lens system, which are suitable for an image pickup apparatus using a solid-state image pickup element, such as a video camera, an electronic still camera, a broadcasting camera or a monitor camera, or an image pickup apparatus such as a silver-halide film camera.

2. Description of the Related Art

In recent years, an image pickup apparatus using a solid-state image pickup element, such as a video camera, a digital still camera, a broadcasting camera, or a monitor camera, as well as a silver-halide film camera has high performance, and the entire apparatus is downsized. Then, a photographing optical system used for the image pickup apparatus is required to be a high-resolution zoom lens system having a short total lens length, a compact (small) size, and a high zoom ratio (high magnification-varying ratio). As a zoom lens system which meets the requirements, there is known a positive-lead type zoom lens system having a lens unit of positive refractive power disposed on the object side. As the positive-lead type zoom lens system, there is known a zoom lens system constituted of five lens units having positive, negative, positive, negative, and positive refractive powers arranged in the stated order from the object side to the image side (see Japanese Patent Application Laid-Open No. 2003-287681 and U.S. Pat. No. 7,679,837).

Generally, a zoom lens system of a small size of the entire system and a high zoom ratio can be realized by enhancing refractive power of a main magnification-varying lens unit and increasing a movement amount of the main magnification-varying lens unit in zooming. However, when the refractive power of the main magnification-varying lens unit is enhanced and the movement amount of the main magnification-varying lens unit is increased, a high zoom ratio can be realized easily, but aberration variation in zooming is increased so that it is difficult to obtain high optical performance over the entire zoom range.

In the five-unit zoom lens system described above, in order to realize a high zoom ratio, a small size of the entire lens system, and good optical performance, it is important to set appropriately refractive power of each lens unit, a move condition or the like of each lens unit in zooming. In particular, it is important to set appropriately move conditions of third and fourth lens units in zooming and a refractive power (inverse number of a focal length) of the second lens unit. If these structures are not set appropriately, it is significantly difficult to realize a small front lens effective diameter, and to obtain high optical performance over the entire zoom range whereas retaining a high zoom ratio.

SUMMARY OF THE INVENTION

It is an object of the present invention to provide a small zoom lens system having a high zoom ratio, a small front lens effective diameter, and high optical performance over the entire zoom range, and to provide an image pickup apparatus including the same.

A zoom lens system according to the present invention includes, in an order from an object side to an image side:
a first lens unit having positive refractive power;
a second lens unit having negative refractive power;
a third lens unit having positive refractive power;
a fourth lens unit having negative refractive power; and
a fifth lens unit having positive refractive power, in which:
the first lens unit, the second lens unit, the third lens unit, the fourth lens unit, and the fifth lens unit move during zooming so that an interval between the first lens unit and the second lens unit is larger at a telephoto end than that at a wide angle end, an interval between the second lens unit and the third lens unit is smaller at the telephoto end than that at the wide angle end, an interval between the third lens unit and the fourth lens unit varies, and an interval between the fourth lens unit and the fifth lens unit is larger at the telephoto end than that at the wide angle end; and
the following conditions are satisfied:

$$0.5 < |f2|/fw < 2.0;$$

$$-6.0 < M4/fw < -2.9; \text{ and}$$

$$0.01 < (D34t - D34w)/fw < 1.50,$$

where f2 denotes a focal length of the second lens unit, fw denotes a focal length of an entire system at the wide angle end, M4 denotes a movement amount of the fourth lens unit in zooming from the wide angle end to the telephoto end (positive sign in a case of moving toward the image side), D34w denotes an interval between the third lens unit and the fourth lens unit at the wide angle end, and D34t denotes an interval between the third lens unit and the fourth lens unit at the telephoto end.

Further features of the present invention will become apparent from the following description of exemplary embodiments with reference to the attached drawings.

BRIEF DESCRIPTION OF THE DRAWINGS

FIG. 1 illustrates lens cross sections at a wide angle end (A), at an intermediate zoom position (B), and at a telephoto end (C), according to a first embodiment of the present invention.

FIG. 2A is an aberration diagram at the wide angle end of a zoom lens system according to the first embodiment of the present invention.

FIG. 2B is an aberration diagram at the intermediate zoom position of the zoom lens system according to the first embodiment of the present invention.

FIG. 2C is an aberration diagram at the telephoto end of the zoom lens system according to the first embodiment of the present invention.

FIG. 4A is an aberration diagram at the wide angle end of a zoom lens system according to the second embodiment of the present invention.

FIG. 4B is an aberration diagram at the intermediate zoom position of the zoom lens system according to the second embodiment of the present invention.

FIG. 4C is an aberration diagram at the telephoto end of the zoom lens system according to the second embodiment of the present invention.

DESCRIPTION OF THE EMBODIMENTS

Hereinafter, preferred embodiments of the present invention are described in detail with reference to the attached drawings. A zoom lens system of the present invention includes a first lens unit having positive refractive power, a second lens unit having negative refractive power, a third lens unit having positive refractive power, a fourth lens unit having negative refractive power, and a fifth lens unit having positive refractive power, arranged in the stated order from an object side to an image side. In zooming, each lens unit moves so that an interval between the first lens unit and the second lens unit is larger at the telephoto end than that at the wide angle end, an interval between the second lens unit and the third lens unit is smaller at the telephoto end than that at the wide angle end, an interval between the third lens unit and the fourth lens unit varies, an interval between the fourth lens unit and the fifth lens unit is larger at the telephoto end than that at the wide angle end.

Figure 3:
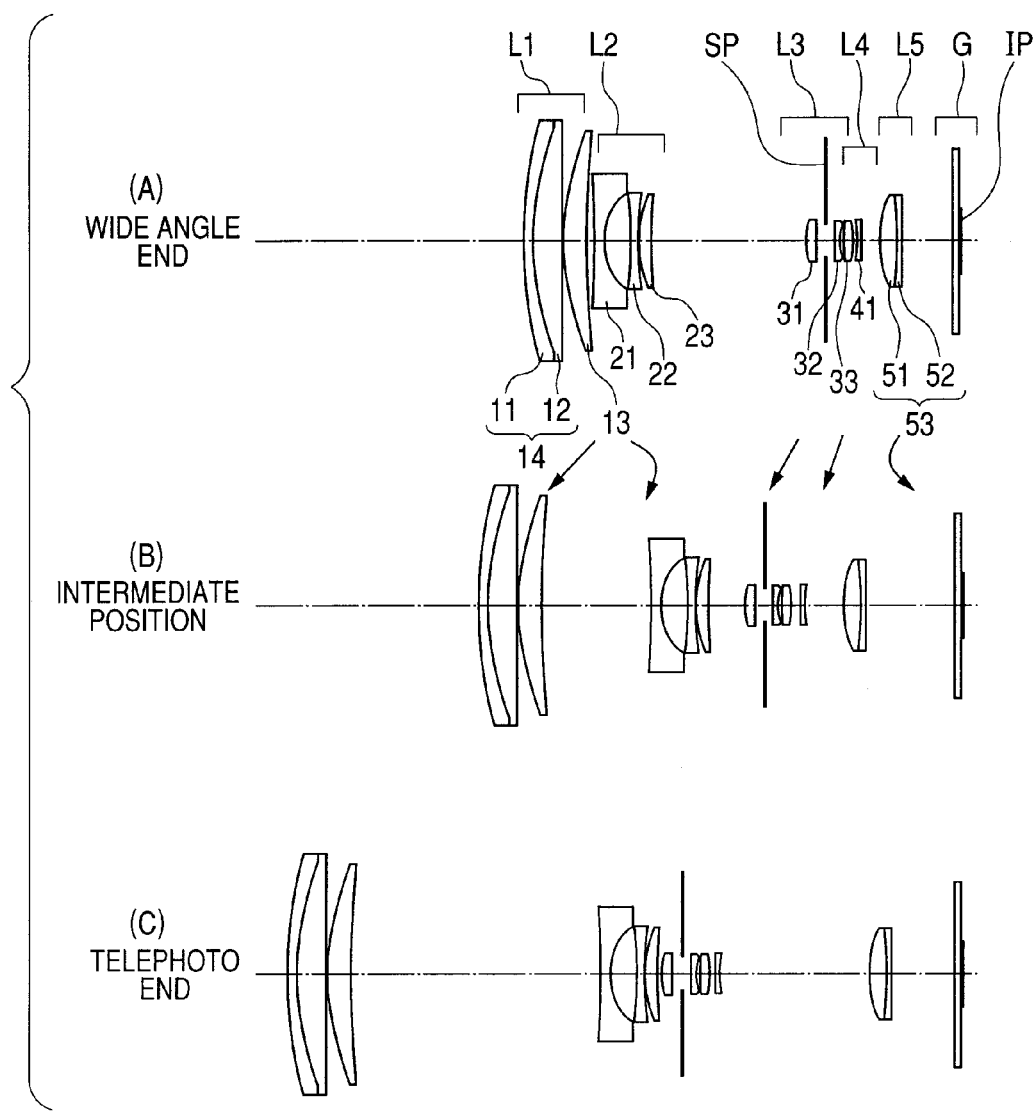
FIG. 3 illustrates lens cross sections at a wide angle end (A), at an intermediate zoom position (B), and at a telephoto end (C), according to a second embodiment of the present invention.

FIG. 1 illustrates lens cross sections at a wide angle end (short focal length end) (A), at an intermediate zoom position (B), and at a telephoto end (long focal length end) (C) of a zoom lens system according to a first embodiment of the present invention. FIGS. 2A, 2B, and 2C are aberration diagrams at a wide angle end, an intermediate zoom position, and a telephoto end, respectively, of the zoom lens system of the first embodiment. The zoom lens system of the first embodiment has a zoom ratio of 13.33 and an aperture ratio of approximately 3.21 to 6.08. FIG. 3 illustrates lens cross sections at a wide angle end (A), at an intermediate zoom position (B), and at a telephoto end (C) of a zoom lens system according to a second embodiment of the present invention.

FIGS. 4A, 4B, and 4C are aberration diagrams at a wide angle end, an intermediate zoom position, and a telephoto end, respectively, of the zoom lens system of the second embodiment. The zoom lens system of the second embodiment has a zoom ratio of 12.00 and an aperture ratio of approximately 3.32 to 6.09.

Figure 5:
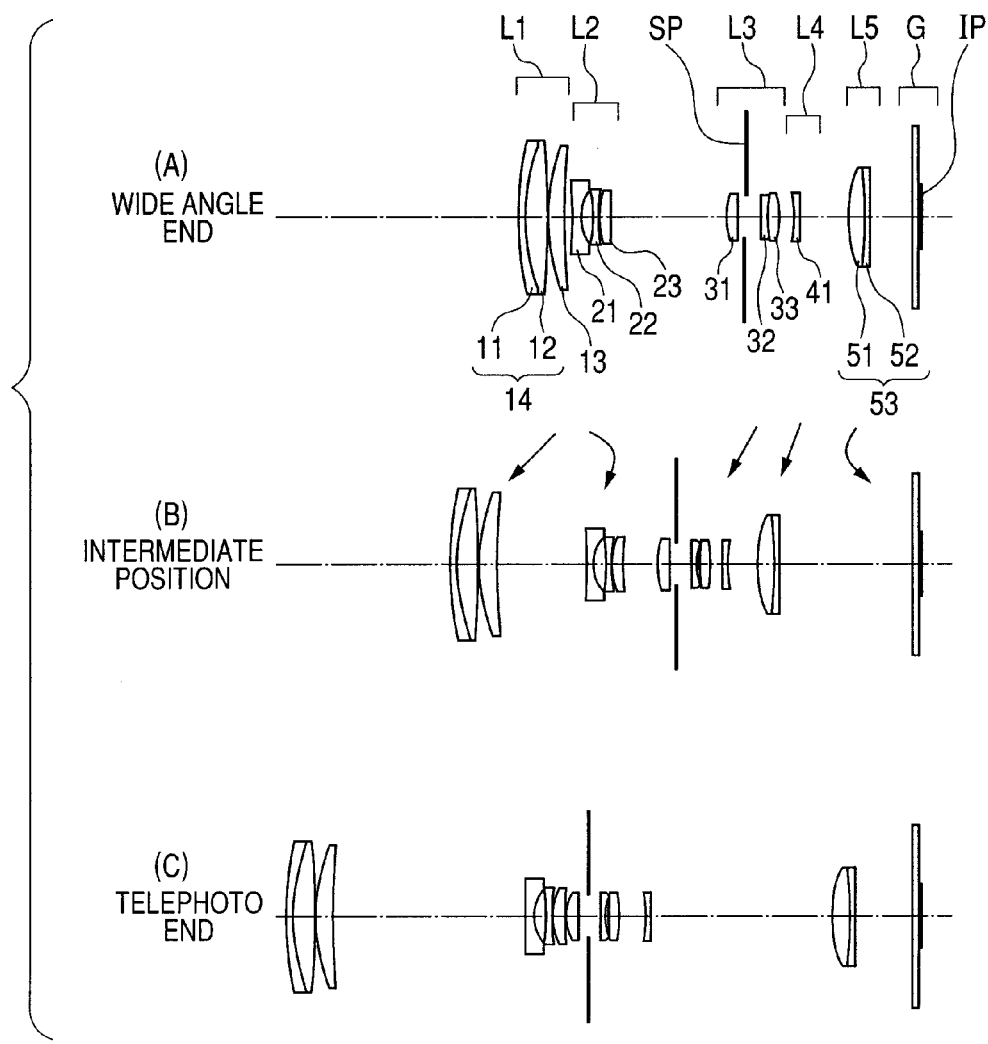
FIG. 5 illustrates lens cross sections at a wide angle end (A), at an intermediate zoom position (B), and at a telephoto end (C), according to a third embodiment of the present invention.
Figure 6A:
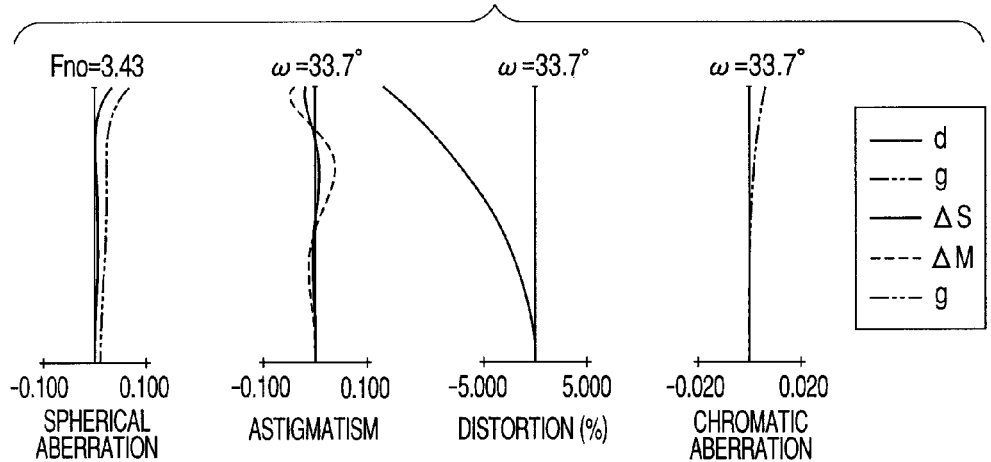
FIG. 6A is an aberration diagram at the wide angle end of a zoom lens system according to the third embodiment of the present invention.
Figure 6B:
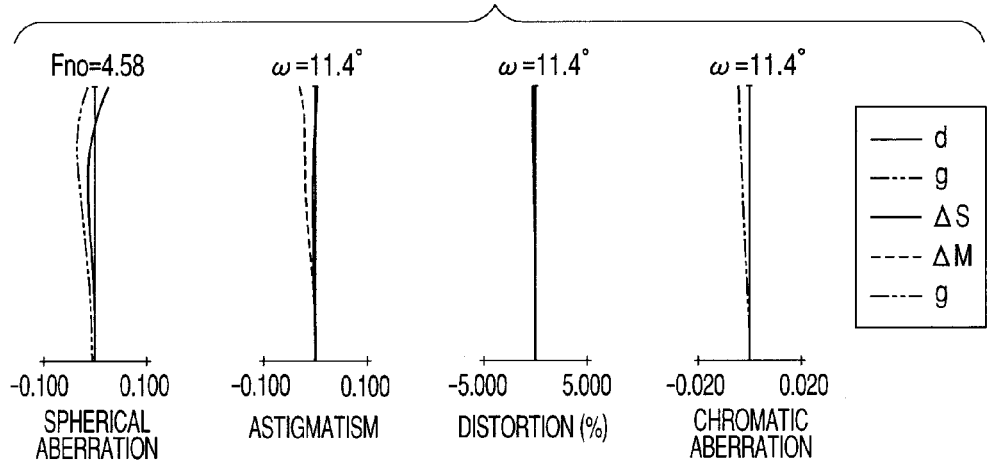
FIG. 6B is an aberration diagram at the intermediate zoom position of the zoom lens system according to the third embodiment of the present invention.
Figure 6C:
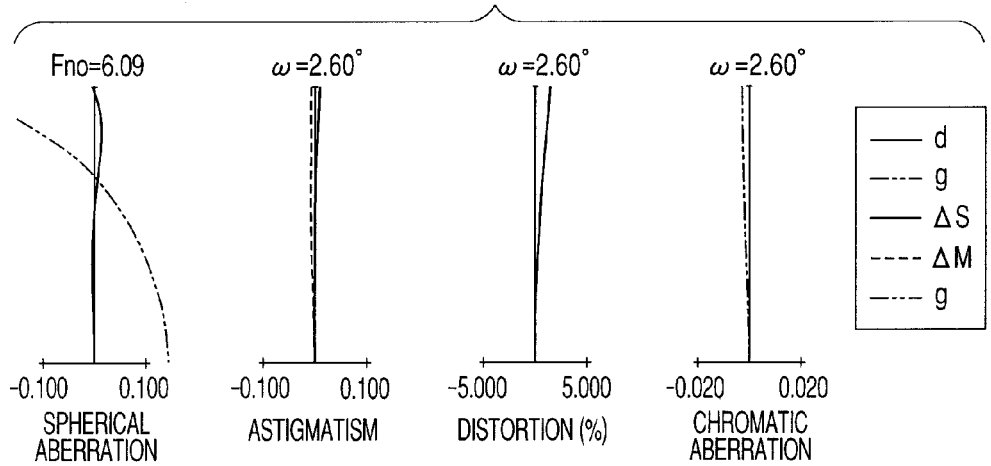
FIG. 6C is an aberration diagram at the telephoto end of the zoom lens system according to the third embodiment of the present invention.
Figure 7:
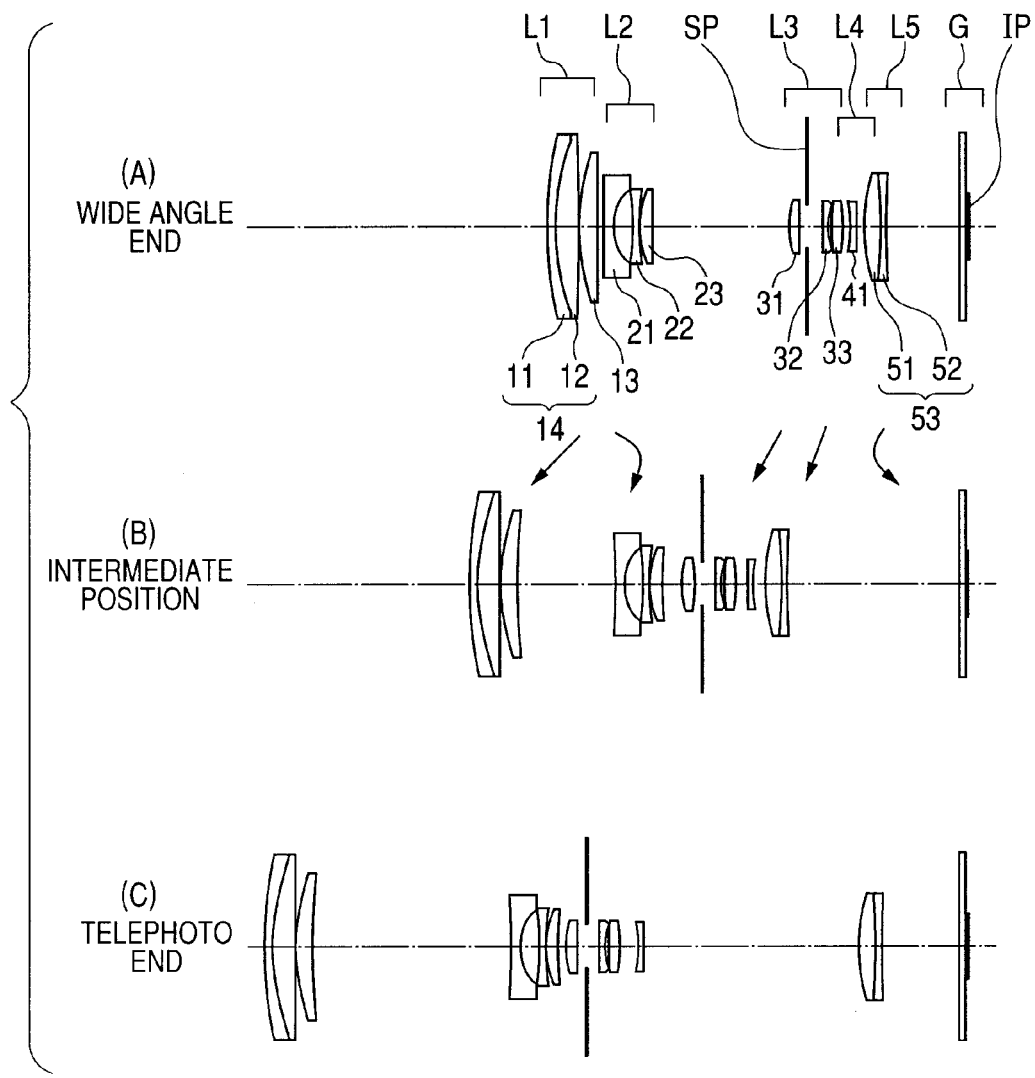
FIG. 7 illustrates lens cross sections at a wide angle end (A), at an intermediate zoom position (B), and at a telephoto end (C), according to a fourth embodiment of the present invention.
Figure 8A:
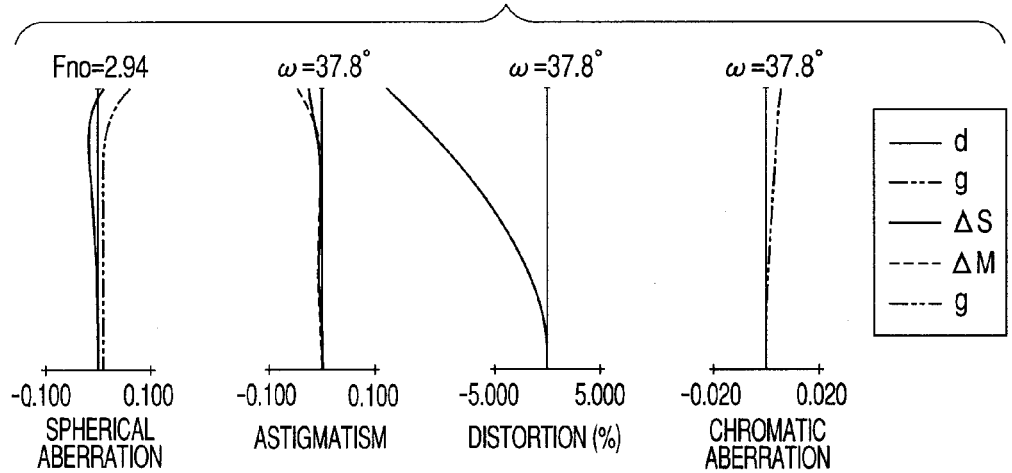
FIG. 8A is an aberration diagram at the wide angle end of a zoom lens system according to the fourth embodiment of the present invention.
Figure 8B:
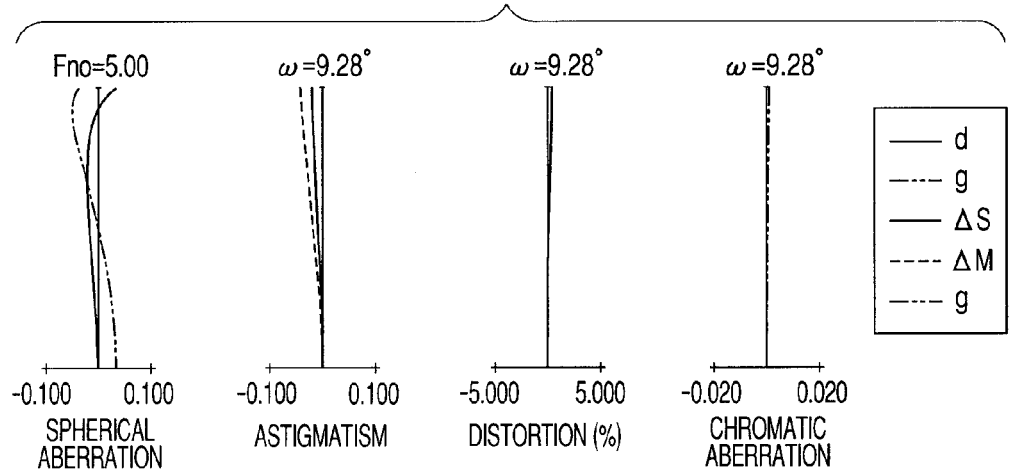
FIG. 8B is an aberration diagram at the intermediate zoom position of the zoom lens system according to the fourth embodiment of the present invention.
Figure 8C:
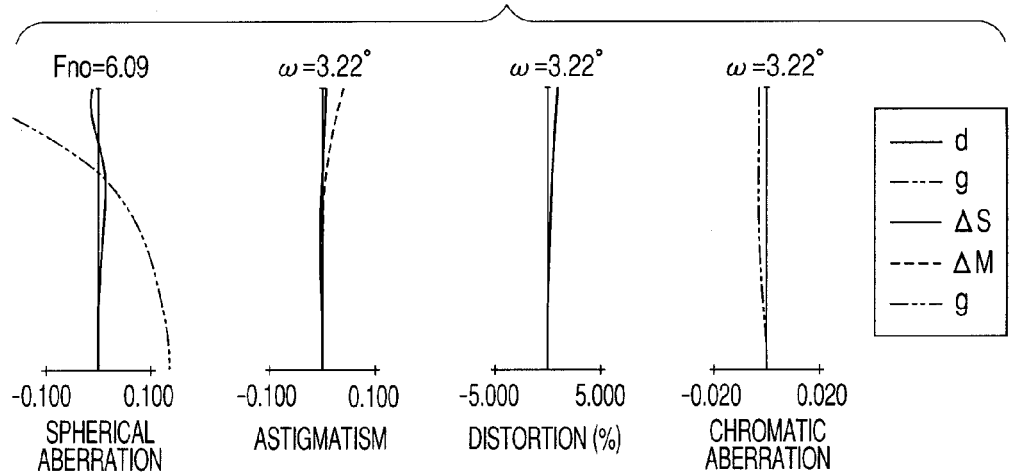
FIG. 8C is an aberration diagram at the telephoto end of the zoom lens system according to the fourth embodiment of the present invention.

FIG. 5 illustrates lens cross sections at a wide angle end (A), at an intermediate zoom position (B), and at a telephoto end (C) of a zoom lens system according to a third embodiment of the present invention. FIGS. 6A, 6B, and 6C are aberration diagrams at a wide angle end, an intermediate zoom position, and a telephoto end, respectively, of the zoom lens system of the third embodiment. The zoom lens system of the third embodiment has a zoom ratio of 14.02 and an aperture ratio of approximately 3.43 to 6.09. FIG. 7 illustrates lens cross sections at a wide angle end (A), at an intermediate zoom position (B), and at a telephoto end (C) of a zoom lens system according to a fourth embodiment of the present invention. FIGS. 8A, 8B, and 8C are aberration diagrams at a wide angle end, an intermediate zoom position, and a telephoto end, respectively, of the zoom lens system of the fourth embodiment. The zoom lens system of the fourth embodiment has a zoom ratio of 13.44 and an aperture ratio of approximately 2.94 to 6.09.

Figure 9:
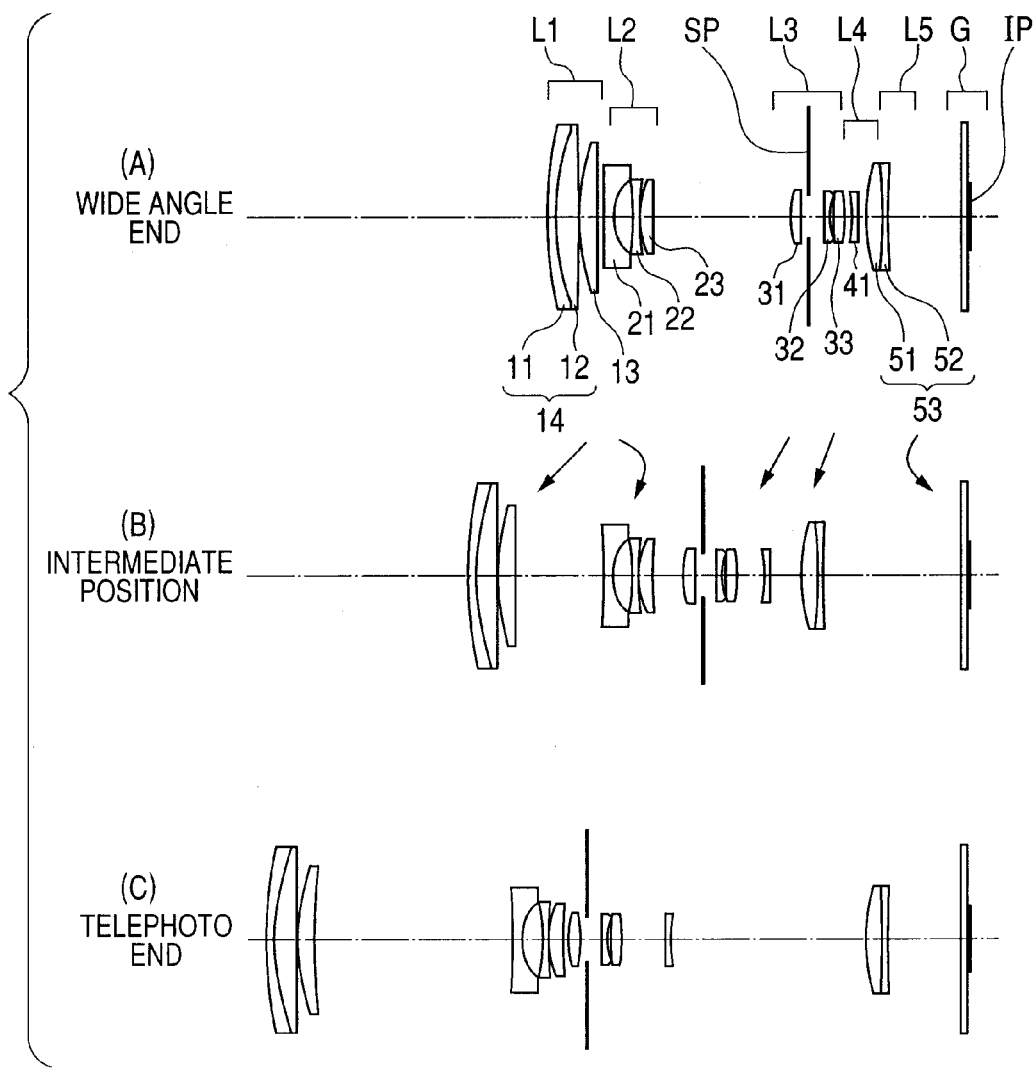
FIG. 9 illustrates lens cross sections at a wide angle end (A), at an intermediate zoom position (B), and at a telephoto end (C), according to a fifth embodiment of the present invention.
Figure 10A:
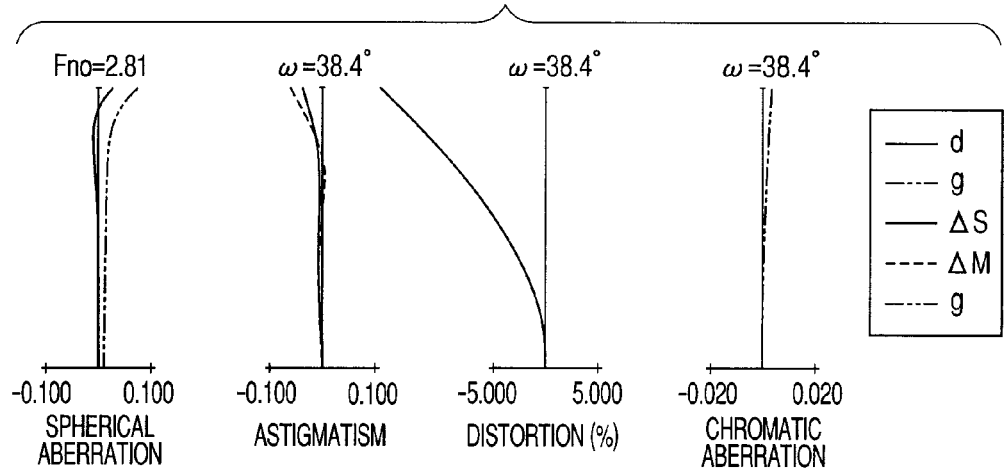
FIG. 10A is an aberration diagram at the wide angle end of a zoom lens system according to the fifth embodiment of the present invention.
Figure 10B:
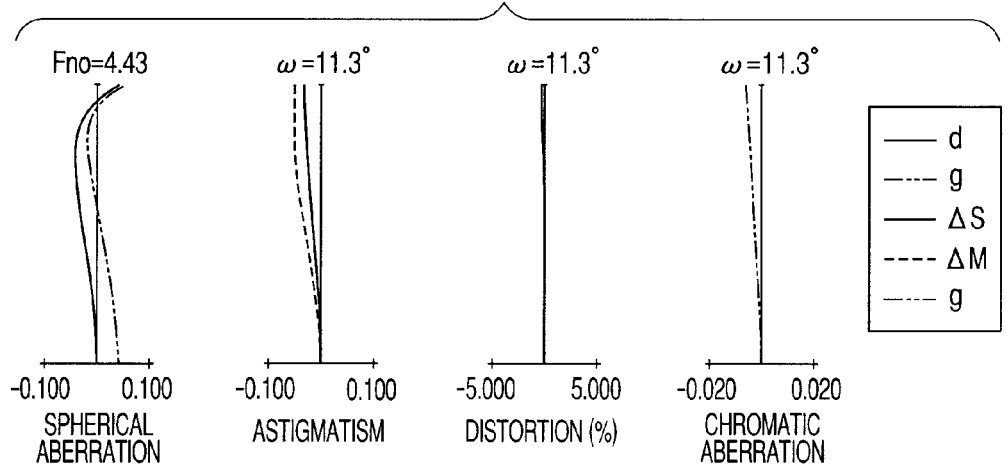
FIG. 10B is an aberration diagram at the intermediate zoom position of the zoom lens system according to the fifth embodiment of the present invention.
Figure 10C:
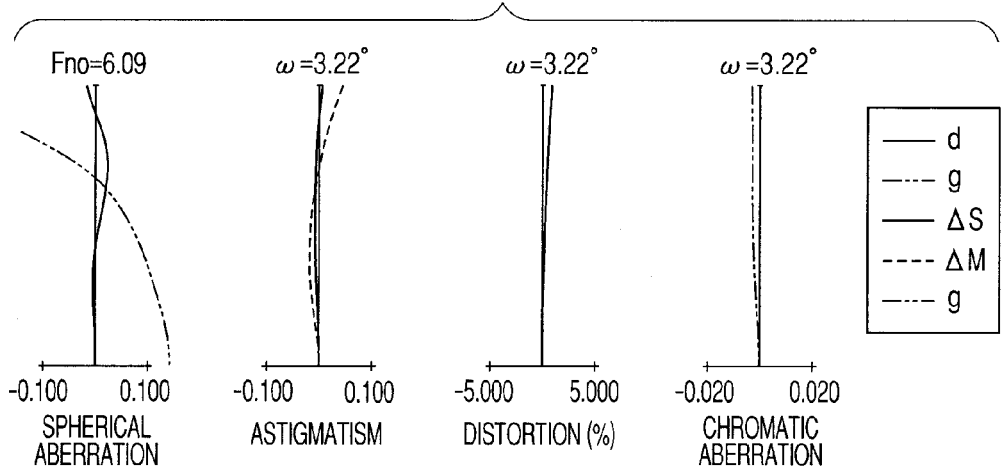
FIG. 10C is an aberration diagram at the telephoto end of the zoom lens system according to the fifth embodiment of the present invention.
Figure 11:
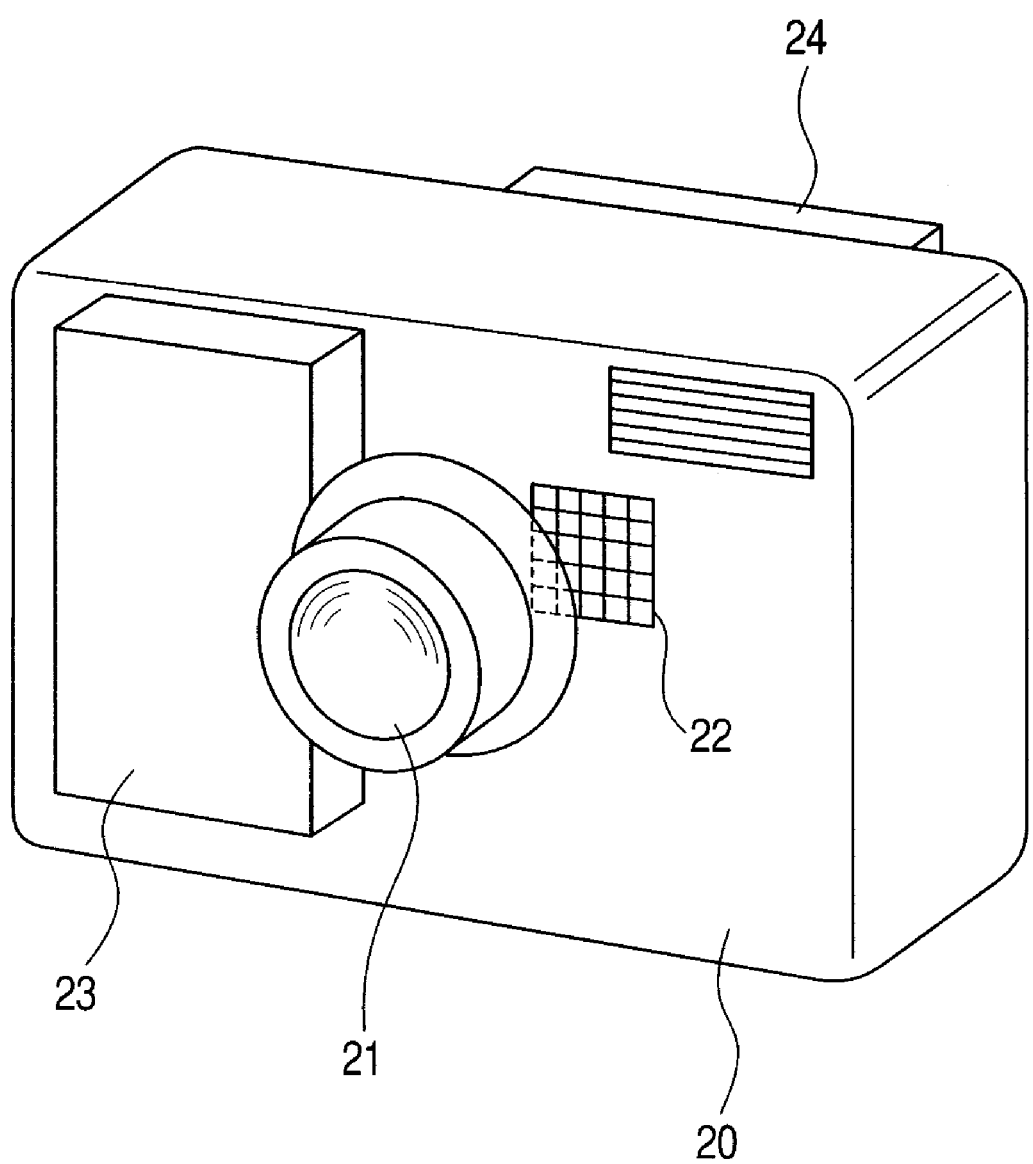
FIG. 11 is a schematic view of a main part of an image pickup apparatus according to the present invention.

FIG. 9 illustrates lens cross sections at a wide angle end (A), at an intermediate zoom position (B), and at a telephoto end (C) of a zoom lens system according to a fifth embodiment of the present invention. FIGS. 10A, 10B, and 10C are aberration diagrams at a wide angle end, an intermediate zoom position, and a telephoto end, respectively, of the zoom lens system of the fifth embodiment. The zoom lens system of the fifth embodiment has a zoom ratio of 13.65 and an aperture ratio of approximately 2.81 to 6.09. FIG. 11 is a schematic view of a main part of an image pickup apparatus according to the present invention. The zoom lens system of the present invention is used for an image pickup apparatus such as a digital camera, a video camera, or a silver-halide film camera, as well as an observation device such as a telescope or binocular, or optical equipment such as a copying machine or a projector. In the lens cross sections, the left side is a front side (object side or magnification side) while the right side is a rear side (image side or reduction side). In the lens cross section, i indicates an order of lens units from the object side to the image side, and Li represents an i-th lens unit.

Next, features of the zoom lens system of each embodiment are described. In the lens cross section of each embodiment, the zoom lens system includes a first lens unit L1 of positive refractive power (optical power, or an inverse number of a focal length), a second lens unit L2 of negative refractive power, a third lens unit L3 of positive refractive power, a fourth lens unit L4 of negative refractive power, and a fifth lens unit L5 of positive refractive power. An F number decision member (hereinafter referred to as an "aperture stop") SP has a function of aperture stop for deciding (limiting) an open F number (Fno) light flux. An optical block G corresponds to an optical filter, a face plate, a quartz low-pass filter, an infrared cut filter, or the like. As an image plane IP, an imaging plane of a solid-state image pickup element (photoelectric transducer) such as a CCD sensor or a CMOS sensor is disposed when the zoom lens system is used as a photographing optical system such as a video camera or a digital still camera. Alternatively, a photosensitive surface corresponding to a film surface is disposed as the image plane when the zoom lens system is used as a photographing optical system of a silver-halide film camera.

In the aberration diagrams, d and g denote a d-line and a g-line, respectively. ΔM and ΔS denote a meridional image plane and a sagittal image plane, respectively. A lateral chromatic aberration is expressed by the g-line. The arrow indicates a movement locus of each lens unit in zooming from the wide angle end to the telephoto end. In the zoom lens system of each embodiment, each lens unit moves in zooming from the wide angle end to the telephoto end, and the intervals between the lens units vary as follows. Specifically, an interval between the first lens unit L1 and the second lens unit L2 increases, an interval between the second lens unit L2 and the third lens unit L3 decreases, an interval between the third lens unit L3 and the fourth lens unit L4 varies, and an interval between the fourth lens unit L4 and the fifth lens unit L5 increases.

In this case, the first lens unit L1, the third lens unit L3, and the fourth lens unit L4 are disposed closer to the object side at the telephoto end than at the wide angle end. In addition, the second lens unit L2 moves along a locus convex toward the image side, and the fifth lens unit L5 moves along a locus convex toward the object side. The F number decision member SP is disposed in the third lens unit L3 in an optical axis direction. When the aperture stop SP is disposed in this way, the interval between the second lens unit L2 and the third lens unit L3 at the telephoto end can be reduced. Therefore, a variation of the interval between the second lens unit L2 and the third lens unit L3 for zooming can be ensured sufficiently. Thus, a zoom lens system having a high zoom ratio can be obtained.

In the zoom lens system of each embodiment, refractive powers of the first lens unit L1 and the second lens unit L2 are enhanced to a certain extent so that an interval between the first lens unit L1 and the aperture stop SP is reduced at the wide angle end. Thus, a lens effective diameter of the first lens unit L1 is reduced. In addition, refractive powers of the third lens unit L3 and the fifth lens unit L5 are enhanced to a certain extent so that an interval between the aperture stop SP and the image plane IP is reduced. Thus, a total lens length at the wide angle end (distance between the first lens surface and the image plane) is shortened.

In the zoom lens system of each embodiment, when zooming from the wide angle end to the telephoto end is performed, the first lens unit L1 is moved toward the object side so that the interval between the first lens unit L1 and the second lens unit L2 becomes larger at the telephoto end than at the wide angle end, to thereby obtain the magnification-varying action. Further, when zooming from the wide angle end to the telephoto end is performed, the third lens unit L3 is moved toward the object side so that the interval between the second lens unit L2 and the third lens unit L3 becomes smaller at the telephoto end than at the wide angle end, to thereby obtain the magnification-varying action. Further, the interval between the third lens unit and the fourth lens unit is made larger at the telephoto end than at the wide angle end so that the magnification-varying action is obtained. In this way, by sharing the magnification-varying action among multiple lens units, a movement stroke of each lens unit in zooming can be shortened while realizing higher zoom ratio, as well as suppressing an increase in the total lens length at the telephoto end. A focus fluctuation in magnification-varying is corrected by moving the fifth lens unit along a locus convex to the object side. Focusing from an object at infinity to an object at a short distance is performed by moving the first lens unit L1 or the fifth lens unit L5 toward the object side.

With the lens structure described above, increases in the total lens length at the wide angle end and the telephoto end can be suppressed while a high zoom ratio can be realized.

Further, in each embodiment, any lens unit may be moved to have a component in the direction perpendicular to the optical axis so as to correct an image blur due to a shake of the zoom lens system.

Next, a lens structure of each lens unit is described. Hereinafter, the description is given in the order from the object side to the image side, unless otherwise stated. The first lens unit L1 includes a cemented lens 14 composed of a negative lens 11 and a positive lens 12, and a positive lens 13 having the surface on the object side that has a convex meniscus shape. In the zoom lens system of each embodiment, refractive power of the first lens unit L1 is enhanced so as to realize a small size and a high zoom ratio. In this case, various aberrations occur in the first lens unit L1. In particular, much spherical aberration occurs at the telephoto side. Therefore, positive refractive power of the first lens unit L1 is shared between the cemented lens 14 and the positive lens 13 so as to reduce the various aberrations. Note that, low dispersion material having an Abbe number larger than 80 is used for the positive lens 12. Thus, longitudinal chromatic aberration and lateral chromatic aberration are corrected appropriately at the telephoto side.

The second lens unit L2 includes: a negative lens 21 having a concave surface on the image side in which an absolute value of refractive power of the image-side surface is larger than that of the object-side surface, a biconcave negative lens 22, and a positive lens 23 having a convex surface on the object side. In the zoom lens system of each embodiment, refractive power of the second lens unit L2 is enhanced so as to obtain a wide angle of field at the wide angle end while realizing a small effective diameter of the first lens unit L1. In this case, various aberrations occur in the second lens unit L2. In particular, a field curvature occurs much at the wide angle side and spherical aberration occurs much at the telephoto side. In each embodiment, the negative refractive power of the second lens unit L2 is shared between the two negative lenses so as to reduce the various aberrations. With this lens structure, a wide angle of field is realized while a small size of the front lens effective diameter and high optical performance are obtained. Further, a high dispersion material having an Abbe number smaller than 20 is used for the positive lens 23 so that refractive power of each lens in the second lens unit L2 that is necessary for achromatization can be configured as small as possible. Thus, the number of lenses is reduced for downsizing. In each embodiment, the second lens unit L2 is composed of two negative lenses and one positive lens.

The third lens unit L3 includes a positive lens 31 having a convex surface on the object side, a negative lens 32 having a concave surface on the image side, and a positive lens 33. The refractive power of the third lens unit L3 is enhanced so as to enhance the magnification-varying action of the third lens unit L3 and to shorten the total lens length at the wide angle end. In this case, various aberrations occur in the third lens unit L3. In particular, much spherical aberration, coma, and longitudinal chromatic aberration occur in the entire zoom range. Therefore, the positive refractive power of the third lens unit L3 is shared between the two positive lenses so that the various aberrations are reduced. Further, a high dispersion material having an Abbe number smaller than 20 is used for the negative lens 32 so as to reduce refractive power of each lens of the third lens unit L3 that is necessary for achromatization. Thus, the number of lenses is reduced so that a small size is realized. In each embodiment, the third lens unit L3 is composed of two positive lenses and one negative lens.

The fourth lens unit L4 is composed of only one negative lens 41. In each embodiment, slimming down and light weight are realized by constituting the fourth lens unit L4 by the small number of lenses. Further, the negative lens 41 is made of a low dispersion material having a relatively large Abbe number (Abbe number of 67 or larger) so as to reduce chromatic aberration variation due to magnification-varying zooming. The fifth lens unit L5 is constituted by a cemented lens 53 of a positive lens 51 and a negative lens 52. By using the cemented lens 53, lateral chromatic aberration is appropriately reduced over the entire zoom range even in the case where refractive power of the fifth lens unit L5 is enhanced.

In each embodiment, a focal length of the second lens unit L2 is denoted by f2, and a focal length of the entire system at the wide angle end is denoted by fw. A movement amount of the fourth lens unit L4 in zooming from the wide angle end to the telephoto end is denoted by M4 (a sign thereof is positive in the case of movement toward the image side). Intervals between the third lens unit L3 and the fourth lens unit L4 (air distances) at the wide angle end and the telephoto end are denoted by D34w and D34t, respectively. In this case, the following conditions are satisfied.

$$0.5 < |f2|/fw < 2.0 \quad (1)$$

$$-6.0 < M4/fw < -2.9 \quad (2)$$

$$0.01 < (D34t - D34w)/fw < 1.50 \quad (3)$$

The conditional expression (1) defines a focal length, i.e., refractive power of the second lens unit L2. If the refractive power is so small that the upper limit in the expression is exceeded, the magnification-varying action of the second lens unit L2 is weakened, and it is difficult to decrease the movement amount and to obtain a high zoom ratio. If a variation of the interval between the first lens unit L1 and the second lens unit L2 is increased in zooming from the wide angle end to the telephoto end so as to obtain a high zoom ratio, the total lens length increases at the telephoto end so that it is difficult to obtain a small size of the entire system. In addition, if the refractive power is so large that the lower limit in the expression is exceeded, much field curvature occurs at the wide angle side and much spherical aberration occurs at the telephoto side with respect to the second lens unit L2, which is not good.

The conditional expression (2) defines a movement amount of the fourth lens unit L4. If a movement amount of the fourth lens unit L4 toward the object side is so small that the upper limit in the expression (2) is exceeded, the magnification-varying action is weakened so that it is difficult to obtain a high zoom ratio. In this case, if the refractive power of the first lens unit L1 is enhanced so as to compensate for the magnifying action, much spherical aberration occurs on the telephoto side, which is not good. In addition, if the refractive power of the second lens unit L2 is enhanced so as to compensate for the magnifying action, much field curvature occurs on the wide angle side, and much spherical aberration occurs on the telephoto side, which is not good. In addition, if the movement amount toward the object side is so large that the lower limit in the expression (2) is exceeded, the total lens length increases at the telephoto end so that it is difficult to obtain a small size of the entire system.

The conditional expression (3) defines a variation of the interval between the third lens unit L3 and the fourth lens unit L4 in zooming from the wide angle end to the telephoto end. If the variation of the interval is so large that the upper limit in the expression (3) is exceeded, the fluctuation in the lateral chromatic aberration due to zooming increases, which is not good. In addition, if the variation of the interval is so small that the lower limit in the expression (3) is exceeded, the magnification-varying action in which the interval between the third lens unit L3 and the fourth lens unit L4 is changed for magnification is weakened. If a variation of the interval between the first lens unit L1 and the second lens unit L2 is increased in zooming from the wide angle end to the telephoto end so as to obtain a high zoom ratio, the total lens length is increased at the telephoto end, which is not good. More preferably, the numerical value ranges in the conditional expressions (1) to (3) are set as follows.

$$0.7 < |f2|/fw < 1.9 \quad (1a)$$

$$-5.5 < M4/fw < -2.9 \quad (2a)$$

$$0.02 < (D34t - D34w)/fw < 1.20 \quad (3a)$$

As described above, according to each embodiment, in the positive-lead type zoom lens system, the total lens length is short, the front lens effective diameter is small, and further a high zoom ratio is realized while various aberrations are corrected appropriately over the entire zoom range, resulting in high optical performance. More preferably in each embodiment, at least one of the various conditions described below should be satisfied.

The focal lengths of the first lens unit L1, the third lens unit L3, the fourth lens unit L4, and the fifth lens unit L5 are denoted by f1, f3, f4, and f5, respectively. The fourth lens unit L4 is composed of one negative lens G41. Curvature radiuses of lens surfaces of the negative lens G41 on the object side and the image side are denoted by R4a and R4b, respectively. In addition, an Abbe number of material of the negative lens G41 is denoted by v4. Intervals between the fourth lens unit L4 and the fifth lens unit L5 at the wide angle end and the telephoto end are denoted by D45w and D45t, respectively. In this case, at least one of the following conditions should be satisfied.

$$4.0 < f1/fw < 15.0 \quad (4)$$

$$1.0 < f3/fw < 3.0 \quad (5)$$

$$2.0 < |f4|/fw < 6.0 \quad (6)$$

$$3.0 < f5/fw < 7.0 \quad (7)$$

$$-0.7 < (R4a + R4b)/(R4a - R4b) < 0.9 \quad (8)$$

$$65 < v4 \quad (9)$$

$$1.5 < (D45t - D45w)/fw < 6.0 \quad (10)$$

The conditional expression (4) defines a focal length, i.e., refractive power of the first lens unit L1. If the refractive power of the first lens unit L1 is so small that the upper limit in the expression (4) is exceeded, the magnification-varying action is weakened. If a movement amount of the first lens unit L1 in zooming is increased so as to compensate for the magnification-varying action, the entire length at the telephoto end increases, which is not good. In addition, if refractive power of the third lens unit L3 is enhanced so as to compensate for the magnification-varying action, much of various aberrations such as spherical aberration, coma, longitudinal chromatic aberration, and the like occur. If the number of lenses is increased for correcting the aberration, thickness of the lens unit increases so that it is difficult to obtain a small size of the entire system. If the refractive power of the first lens unit L1 is so large that the lower limit in the conditional expression (4) is exceeded, much spherical aberration occurs in the first lens unit L1 on the telephoto side. If the number of lenses is increased so as to correct aberration, a size of the first lens unit L1 becomes large so that the front lens effective diameter increases, which is not preferable.

The conditional expression (5) defines a focal length, i.e., refractive power of the third lens unit L3. If refractive power of the third lens unit L3 is so small that the upper limit in the expression (5) is exceeded, the magnification-varying action of the third lens unit L3 is weakened so that it is difficult to obtain a high zoom ratio. If a movement amount of the third lens unit is increased in zooming so as to compensate for the magnification ratio, the total lens length increases at the telephoto end, which is not good. If the refractive power of the third lens unit L3 is so large that the lower limit in the conditional expression (5) is exceeded, much spherical aberration, coma, longitudinal chromatic aberration and the like occur in the third lens unit L3 in the entire zoom range, which is not good.

The conditional expression (6) defines a focal length, i.e., refractive power of the fourth lens unit L4. If the refractive power of the fourth lens unit L4 is so small that the upper limit in the expression (6) is exceeded, the magnification-varying action is weakened so that it is difficult to obtain a high zoom ratio. If movement amounts of the third lens unit L3 and the fourth lens unit L4 are increased so as to compensate for the magnification ratio in zooming, the total lens length is increased at the telephoto end, which is not good. If the refractive power of the fourth lens unit L4 is so large that the lower limit in the conditional expression (6) is exceeded, much spherical aberration, longitudinal chromatic aberration, and the like occur in the entire zoom range. In this case, if the number of lenses is increased so as to correct aberration, it is difficult to obtain a small size of the entire system.

The conditional expression (7) defines a focal length, i.e., refractive power of the fifth lens unit L5. If the refractive power of the fifth lens unit L5 is so small that the upper limit in the expression is exceeded, an effect of correcting focus fluctuation in focusing by the fifth lens unit L5 is weakened so that a movement amount for focusing increases. Thus, it is difficult to realize quick focusing. If the refractive power of the fifth lens unit L5 is so large that the lower limit in the conditional expression (7) is exceeded, Petzval sum increases so that a field curvature is increased in the entire zoom range. If the number of lenses is increased, the field curvature can be suppressed. In this case, however, weight of the lens increases so that drive force for driving the fifth lens unit L5 increases, which is not good.

The conditional expression (8) defines a shape factor of the negative lens in the fourth lens unit L4. If a value of the conditional expression (8) is larger than zero, a lens surface on the image side has a shape that is concave toward the image side. If the curvature of the lens surface on the image side is so sharp that the upper limit in the expression (8) is exceeded, much astigmatic difference occurs in off-axis light beam in the entire zoom range. If a value of the conditional expression (8) is smaller than zero, the lens surface on the object side has a shape that is concave toward the object side. If the curvature of the lens surface on the object side is so sharp that the lower limit in the expression is exceeded, much spherical aberration, longitudinal chromatic aberration, and the like occur over the entire zoom range.

The conditional expression (9) defines an Abbe number of material of the negative lens in the fourth lens unit L4. If the Abbe number is so small that the lower limit in the expression is exceeded, i.e., if the dispersion is too large, much lateral chromatic aberration occurs in the fourth lens unit L4. In particular, it is difficult to reduce lateral chromatic aberration over the entire zoom range in case where the zoom lens system has a high zoom ratio.

The conditional expression (10) defines a variation of an interval between the fourth lens unit L4 and the fifth lens unit L5 in zooming. If a variation of the interval is so large that the upper limit in the expression (10) is exceeded, a position of the fifth lens unit L5 at the telephoto end is relatively close to the image side. In this case, a lateral magnification of the fifth lens unit L5 increases so that a focus correction effect in focusing by the fifth lens unit L5 is weakened. As a result, a focus movement amount in focusing by the fifth lens unit L5 increases so that it is difficult to realize quick focusing. If a variation of the distance is so small that the lower limit in the expression (10) is exceeded, a position of the fifth lens unit L5 at the telephoto end is relatively close to the object side. In this case, a movement stroke of the fifth lens unit L5 increases in zooming from the wide angle end to the telephoto end so that a size of the drive unit is increased, which is not good. More preferably, the numerical value ranges in the conditional expressions (4) to (10) are set as follows.

$$5.0 < f1/fw < 14.0 \quad (4a)$$

$$1.3 < f3/fw < 2.7 \quad (5a)$$

$$3.0 < |f4|/fw < 5.9 \quad (6a)$$

$$3.4 < f5/fw < 6.7 \quad (7a)$$

$$-0.5 < (R4a+R4b)/(R4a-R4b) < 0.7 \quad (8a)$$

$$67 < v4 \quad (9a)$$

$$2.0 < (D45t-D45w)/fw < 5.5 \quad (10a)$$

As described above, according to each embodiment, it is possible to obtain a zoom lens system which has a short total lens length, a small front lens effective diameter, and a high zoom ratio equal to or larger than 12.

Next, Numerical Embodiments corresponding to the embodiments of the present invention are described. In each Numerical Embodiment, i denotes an order of a surface from the object side. In each Numerical Embodiment, ri denotes a curvature radius of the i-th lens surface counted from the object side. Symbol di denotes i-th lens thickness and air distance counted from the object side. Symbols ndi and vdi respectively denote a refractive index and Abbe number of the i-th material glass counted from the object side with respect to the d-line. The last two surfaces are the glass block. In each Numerical Embodiment, the glass block is shown as a sixth lens unit (having an infinite focal length). An aspheric shape is expressed by the following equation.

$$X = \frac{(1/R)H^2}{1+\sqrt{1-(1+K)(H/R)^2}} + A4 \times H^4 + A6 \times H^6 + A8 \times H^8 + A10 \times H^{10}$$

where the X axis corresponds to the optical axis direction, the H axis corresponds to the direction perpendicular to the optical axis, the light propagation direction is positive, R denotes a paraxial radius of curvature, K denotes a conic constant, and A4, A6, A8, and A10 denote aspheric coefficients, respectively.

In addition, [e+X] means [$\times 10^{+X}$], and [e-X] means [$\times 10^{-X}$]. BF denotes back focus, which is obtained by air conversion of a distance between a lens end surface and a paraxial image plane (back focus). The total lens length is a distance between a lens front surface and the lens end surface plus the back focus BF. The aspheric surface is indicated by adding * as a suffix to surface number. A relationship among conditional expressions described above and various numerical values in Numerical Embodiments is shown in Table 1.

Numerical Embodiment 1
Unit: mm

Surface data

| Surface Number | r | d | nd | vd |
|---|---|---|---|---|
| 1 | 47.198 | 0.90 | 1.84666 | 23.9 |
| 2 | 28.488 | 2.50 | 1.49700 | 81.5 |
| 3 | 539.546 | 0.20 | | |
| 4 | 27.858 | 1.95 | 1.69680 | 55.5 |
| 5 | 130.634 | (Variable) | | |
| 6 | −142.993 | 1.03 | 1.85135 | 40.1 |
| 7* | 5.724 | 2.27 | | |
| 8 | −32.718 | 0.60 | 1.80400 | 46.6 |
| 9 | 20.754 | 0.20 | | |
| 10 | 10.630 | 1.40 | 1.94595 | 18.0 |
| 11 | 41.156 | (Variable) | | |
| 12* | 7.790 | 1.40 | 1.58313 | 59.4 |
| 13* | −42.498 | 0.92 | | |
| 14 (Stop) | ∞ | 1.48 | | |
| 15 | 14.621 | 0.60 | 1.94595 | 18.0 |
| 16 | 7.752 | 0.51 | | |
| 17 | 38.232 | 1.45 | 1.60311 | 60.6 |
| 18 | −10.112 | (Variable) | | |
| 19 | −22.588 | 0.50 | 1.48749 | 70.2 |
| 20 | 23.874 | (Variable) | | |
| 21 | 15.072 | 2.00 | 1.69680 | 55.5 |
| 22 | −42.895 | 0.60 | 1.72825 | 28.5 |
| 23 | 240.459 | (Variable) | | |
| 24 | ∞ | 0.80 | 1.51633 | 64.1 |
| 25 | ∞ | 0.90 | | |
| Image plane | ∞ | | | |

Aspherical Surface data

Seventh surface

K = −1.12918e+000　A4 = 7.09263e−004　A6 = 1.64697e−005
A8 = −3.81294e−007　A10 = 1.794016−008

Twelfth surface

K = −1.22101e+000　A4 = 4.95648e−005　A6 = 7.55352e−006
A8 = 3.03893e−006　A10 = −1.83896e−007

Thirteenth surface

K = −1.36363e+002　A4 = 9.00236e−007　A6 = 2.00697e−005
A8 = 2.20070e−006　A10 = −1.36759e−007

Various data
Zoom ratio 13.32

| | Wide angle | Intermediate | Telephoto |
|---|---|---|---|
| Focal length | 5.12 | 17.53 | 68.25 |
| F number | 3.21 | 4.62 | 6.08 |
| Angle of field | 37.59 | 12.51 | 3.20 |
| Image height | 3.33 | 3.88 | 3.88 |
| Total lens length | 48.61 | 56.13 | 75.70 |
| BF | 6.85 | 13.90 | 7.26 |
| d5 | 0.95 | 11.54 | 25.33 |
| d11 | 15.79 | 4.21 | 0.71 |
| d18 | 1.90 | 2.57 | 3.04 |
| d20 | 2.51 | 3.39 | 18.85 |
| d23 | 5.52 | 12.48 | 5.84 |

Zoom lens unit data

| Unit | First surface | Focal length |
|---|---|---|
| 1 | 1 | 41.07 |
| 2 | 6 | −6.74 |
| 3 | 12 | 10.27 |
| 4 | 19 | −23.73 |
| 5 | 21 | 23.41 |
| 6 | 24 | ∞ |

Numerical Embodiment 2
Unit: mm

Surface data

| Surface Number | r | d | nd | vd |
|---|---|---|---|---|
| 1 | 54.074 | 1.00 | 1.84666 | 23.9 |
| 2 | 32.302 | 3.20 | 1.49700 | 81.5 |
| 3 | 360.632 | 0.20 | | |
| 4 | 30.037 | 2.60 | 1.69680 | 55.5 |
| 5 | 117.051 | (Variable) | | |
| 6 | −208.724 | 1.03 | 1.85135 | 40.1 |
| 7* | 5.185 | 3.33 | | |
| 8 | −99.402 | 0.60 | 1.80400 | 46.6 |
| 9 | 27.189 | 0.20 | | |
| 10 | 11.929 | 1.40 | 1.94595 | 18.0 |
| 11 | 39.178 | (Variable) | | |
| 12* | 7.196 | 1.30 | 1.58313 | 59.4 |
| 13* | −29.560 | 1.00 | | |
| 14 (Stop) | ∞ | 1.00 | | |
| 15 | 14.252 | 0.60 | 1.92286 | 18.9 |
| 16 | 7.037 | 0.40 | | |
| 17 | 411.445 | 1.20 | 1.60311 | 60.6 |
| 18 | −7.895 | (Variable) | | |
| 19 | −38.702 | 0.50 | 1.48749 | 70.2 |
| 20 | 16.344 | (Variable) | | |
| 21 | 14.606 | 2.00 | 1.69680 | 55.5 |
| 22 | −27.378 | 0.60 | 1.84666 | 23.9 |
| 23 | 186.352 | (Variable) | | |
| 24 | ∞ | 0.80 | 1.51633 | 64.1 |
| 25 | ∞ | 0.40 | | |
| Image plane | ∞ | | | |

Aspherical Surface data

Seventh surface

K = −1.20106e+000　A4 = 6.85364e−004　A6 = 7.17245e−006
A8 = −4.36880e−008　A10 = 1.09840e−009

Twelfth surface

K = −9.75517e−001　A4 = 3.91334e−005　A6 = 3.84575e−006
A8 = 2.18563e−008　A10 = 2.82694e−007

Thirteenth surface

K = −1.08163e+002　A4 = −5.59344e−005　A6 = 3.70488e−005
A8 = −2.66289e−006　A10 = 4.33412e−007

Various data
Zoom ratio 12.00

| | Wide angle | Intermediate | Telephoto |
|---|---|---|---|
| Focal length | 4.10 | 13.85 | 49.20 |
| F number | 3.32 | 4.64 | 6.09 |
| Angle of field | 44.06 | 15.48 | 4.44 |
| Image height | 3.33 | 3.88 | 3.88 |
| Total lens length | 49.90 | 55.28 | 77.13 |
| BF | 6.78 | 11.14 | 8.40 |
| d5 | 0.70 | 12.38 | 28.41 |
| d11 | 17.68 | 4.21 | 0.50 |
| d18 | 0.50 | 1.06 | 0.70 |
| d20 | 2.08 | 4.34 | 16.95 |
| d23 | 5.85 | 10.21 | 7.48 |

Zoom lens unit data

| Unit | First surface | Focal length |
|---|---|---|
| 1 | 1 | 48.27 |
| 2 | 6 | −7.20 |
| 3 | 12 | 9.50 |
| 4 | 19 | −23.50 |
| 5 | 21 | 26.10 |
| 6 | 24 | ∞ |

| Numerical Embodiment 3 Unit: mm | | | | |
|---|---|---|---|---|
| Surface data | | | | |
| Surface Number | r | d | nd | vd |
| 1 | 47.512 | 0.90 | 1.80518 | 25.4 |
| 2 | 28.470 | 2.50 | 1.43875 | 95.0 |
| 3 | −103.246 | 0.20 | | |
| 4 | 24.516 | 1.95 | 1.60311 | 60.6 |
| 5 | 105.244 | (Variable) | | |
| 6 | −54.280 | 0.90 | 1.85135 | 40.1 |
| 7* | 6.396 | 1.55 | | |
| 8 | −15.150 | 0.60 | 1.80400 | 46.6 |
| 9 | 18.473 | 0.20 | | |
| 10 | 11.244 | 1.30 | 1.94595 | 18.0 |
| 11 | 156.095 | (Variable) | | |
| 12* | 7.541 | 1.40 | 1.58313 | 59.4 |
| 13* | −40.115 | 0.92 | | |
| 14 (Stop) | ∞ | 1.48 | | |
| 15 | 15.516 | 0.60 | 1.92286 | 18.9 |
| 16 | 7.666 | 0.38 | | |
| 17 | 24.239 | 1.45 | 1.60311 | 60.6 |
| 18 | −10.876 | (Variable) | | |
| 19 | −19.865 | 0.50 | 1.48749 | 70.2 |
| 20 | 28.946 | (Variable) | | |
| 21 | 16.674 | 2.00 | 1.69680 | 55.5 |
| 22 | −105.806 | 0.60 | 1.72825 | 28.5 |
| 23 | −1363.916 | (Variable) | | |
| 24 | ∞ | 0.80 | 1.51633 | 64.1 |
| 25 | ∞ | 0.40 | | |
| Image plane | ∞ | | | |

Aspherical Surface data

Seventh surface

K = −1.10035e+000  A4 = 6.44761e−004  A6 = 2.11764e−005
A8 = −6.91246e−007  A10 = 6.04302e−008
Twelfth surface K = −1.59948e+000  A4 = 1.53111e−004  A6 = 1.87543e−005
A8 = 2.79099e−006  A10 = −8.81726e−008
Thirteenth surface K = −1.28089e+002  A4 = −3.14007e−005  A6 = 2.72446e−005
A8 = 3.04532e−006  A10 = −1.02041e−007

Various data
Zoom ratio 14.03

| | Wide angle | Intermediate | Telephoto |
|---|---|---|---|
| Focal length | 5.99 | 19.31 | 84.00 |
| F number | 3.43 | 4.58 | 6.09 |
| Angle of field | 33.74 | 11.37 | 2.60 |
| Image height | 3.41 | 3.88 | 3.88 |
| Total lens length | 48.06 | 56.23 | 75.83 |
| BF | 5.99 | 16.88 | 7.88 |
| d5 | 1.00 | 10.70 | 23.32 |
| d11 | 13.79 | 4.01 | 0.32 |
| d18 | 1.90 | 1.71 | 3.07 |
| d20 | 5.96 | 3.50 | 21.82 |
| d23 | 5.06 | 15.95 | 6.95 |

Zoom lens unit data

| Unit | First surface | Focal length |
|---|---|---|
| 1 | 1 | 36.85 |
| 2 | 6 | −6.00 |
| 3 | 12 | 9.87 |
| 4 | 19 | −24.08 |
| 5 | 21 | 23.81 |
| 6 | 24 | ∞ |

| Numerical Embodiment 4 Unit: mm | | | | |
|---|---|---|---|---|
| Surface data | | | | |
| Surface Number | r | d | nd | vd |
| 1 | 47.583 | 0.90 | 1.84666 | 23.9 |
| 2 | 28.322 | 2.50 | 1.49700 | 81.5 |
| 3 | 729.820 | 0.20 | | |
| 4 | 26.701 | 1.95 | 1.69680 | 55.5 |
| 5 | 146.721 | (Variable) | | |
| 6 | −467.408 | 1.03 | 1.85135 | 40.1 |
| 7* | 5.837 | 2.39 | | |
| 8 | −28.474 | 0.60 | 1.80400 | 46.6 |
| 9 | 18.155 | 0.20 | | |
| 10 | 10.617 | 1.40 | 1.94595 | 18.0 |
| 11 | 44.585 | (Variable) | | |
| 12* | 7.918 | 1.40 | 1.58313 | 59.4 |
| 13* | −77.474 | 0.92 | | |
| 14 (Stop) | ∞ | 1.48 | | |
| 15 | 14.846 | 0.60 | 1.94595 | 18.0 |
| 16 | 7.926 | 0.44 | | |
| 17 | 31.075 | 1.45 | 1.60311 | 60.6 |
| 18 | −9.535 | (Variable) | | |
| 19 | −20.110 | 0.50 | 1.49700 | 81.5 |
| 20 | 31.122 | (Variable) | | |
| 21 | 17.648 | 2.00 | 1.69680 | 55.5 |
| 22 | −45.634 | 0.60 | 1.72825 | 28.5 |
| 23 | 468.233 | (Variable) | | |
| 24 | ∞ | 0.80 | 1.51633 | 64.1 |
| 25 | ∞ | 0.40 | | |
| Image plane | ∞ | | | |

Aspherical Surface data

Seventh surface

K = −1.02378e+000  A4 = 6.84596e−004  A6 = 1.55860e−005
A8 = −2.66856e−007  A10 = 2.37450e−008
Twelfth surface K = −2.08649e+000  A4 = 2.15383e−004  A6 = −6.03047e−006
A8 = 2.35290e−006  A10 = −1.40192e−007
Thirteenth surface K = 1.10745e+002  A4 = 1.77179e−004  A6 = −2.72390e−006
A8 = 2.26783e−006  A10 = −1.31392e−007

Various data
Zoom ratio 13.43

| | Wide angle | Intermediate | Telephoto |
|---|---|---|---|
| Focal length | 5.08 | 23.62 | 68.26 |
| F number | 2.94 | 5.00 | 6.09 |
| Angle of field | 37.80 | 9.28 | 3.22 |
| Image height | 3.33 | 3.88 | 3.88 |
| Total lens length | 48.48 | 57.37 | 80.71 |
| BF | 9.37 | 20.87 | 9.95 |
| d5 | 0.88 | 10.88 | 22.39 |
| d11 | 15.81 | 2.19 | 0.72 |
| d18 | 0.90 | 1.55 | 2.01 |
| d20 | 0.97 | 1.31 | 25.09 |
| d23 | 8.44 | 19.95 | 9.02 |

Zoom lens unit data

| Unit | First surface | Focal length |
|---|---|---|
| 1 | 1 | 38.47 |
| 2 | 6 | −6.62 |
| 3 | 12 | 10.28 |
| 4 | 19 | −24.50 |
| 5 | 21 | 26.76 |
| 6 | 24 | ∞ |

Numerical Embodiment 5
Unit: mm

Surface data

| Surface Number | r | d | nd | vd |
|---|---|---|---|---|
| 1 | 46.098 | 0.90 | 1.84666 | 23.9 |
| 2 | 28.596 | 2.50 | 1.49700 | 81.5 |
| 3 | 863.149 | 0.20 | | |
| 4 | 29.894 | 1.95 | 1.69680 | 55.5 |
| 5 | 179.501 | (Variable) | | |
| 6 | 657.168 | 1.00 | 1.85135 | 40.1 |
| 7* | 5.851 | 2.49 | | |
| 8 | −24.233 | 0.60 | 1.80400 | 46.6 |
| 9 | 18.877 | 0.20 | | |
| 10 | 10.867 | 1.40 | 1.94595 | 18.0 |
| 11 | 47.319 | (Variable) | | |
| 12* | 8.081 | 1.40 | 1.58313 | 59.4 |
| 13* | −64.258 | 0.92 | | |
| 14 (Stop) | ∞ | 1.48 | | |
| 15 | 14.608 | 0.60 | 1.94595 | 18.0 |
| 16 | 7.956 | 0.47 | | |
| 17 | 32.856 | 1.45 | 1.60311 | 60.6 |
| 18 | −10.086 | (Variable) | | |
| 19 | −25.588 | 0.50 | 1.59240 | 68.3 |
| 20 | 33.781 | (Variable) | | |
| 21 | 17.340 | 2.00 | 1.69680 | 55.5 |
| 22 | −56.560 | 0.60 | 1.76182 | 26.5 |
| 23 | −385.476 | (Variable) | | |
| 24 | ∞ | 0.80 | 1.51633 | 64.1 |
| 25 | ∞ | 0.40 | | |
| Image plane | ∞ | | | |

Aspherical Surface data

Seventh surface

K = −1.05658e+000  A4 = 7.06913e−004  A6 = 2.39770e−005
A8 = −8.48244e−007  A10 = 4.56287e−008

Twelfth surface

K = −2.03441e+000  A4 = 1.33420e−004  A6 = −6.93158e−006
A8 = 2.29951e−006  A10 = −1.67742e−007

Thirteenth surface

K = 1.07246e+002  A4 = 1.35840e−004  A6 = −4.17686e−006
A8 = 2.16787e−006  A10 = −1.60151e−007

Numerical Embodiment 5
Unit: mm

Various data
Zoom ratio 13.66

| | Wide angle | Intermediate | Telephoto |
|---|---|---|---|
| Focal length | 5.00 | 19.47 | 68.25 |
| F number | 2.81 | 4.43 | 6.09 |
| Angle of field | 38.44 | 11.27 | 3.22 |
| Image height | 3.33 | 3.88 | 3.88 |
| Total lens length | 48.63 | 58.39 | 81.70 |
| BF | 9.58 | 17.09 | 9.77 |
| d5 | 0.77 | 10.33 | 23.12 |
| d11 | 15.75 | 3.45 | 0.67 |
| d18 | 0.90 | 3.05 | 5.01 |
| d20 | 0.97 | 3.81 | 22.48 |
| d23 | 8.66 | 16.16 | 8.85 |

Zoom lens unit data

| Unit | First surface | Focal length |
|---|---|---|
| 1 | 1 | 40.26 |
| 2 | 6 | −6.54 |
| 3 | 12 | 10.49 |
| 4 | 19 | −24.50 |
| 5 | 21 | 24.42 |
| 6 | 24 | ∞ |

TABLE 1

| | First embodiment | Second embodiment | Third embodiment | Fourth embodiment | Fifth embodiment |
|---|---|---|---|---|---|
| Conditional expression (1) | 1.31 | 1.76 | 1.00 | 1.30 | 1.31 |
| Conditional expression (2) | −3.25 | −4.02 | −2.96 | −4.86 | −4.34 |
| Conditional expression (3) | 0.203 | 0.049 | 0.196 | 0.219 | 0.823 |
| Conditional expression (4) | 8.02 | 11.77 | 6.15 | 7.57 | 8.06 |
| Conditional expression (5) | 2.00 | 2.32 | 1.65 | 2.02 | 2.10 |
| Conditional expression (6) | 4.63 | 5.73 | 4.02 | 4.82 | 4.90 |
| Conditional expression (7) | 4.57 | 6.37 | 3.98 | 5.27 | 4.89 |
| Conditional expression (8) | −0.03 | 0.41 | −0.19 | −0.21 | −0.14 |
| Conditional expression (9) | 70.23 | 70.23 | 70.23 | 81.54 | 68.30 |
| Conditional expression (10) | 3.19 | 3.63 | 2.65 | 4.75 | 4.30 |

Next, an embodiment of a digital still camera in which the zoom lens system described above in each embodiment is used as a photographing optical system is described with reference to FIG. 11. In FIG. 11, the digital still camera includes a camera main body 20 and a photographing optical system 21 constituted of any one of the zoom lens systems described above in the first to sixth embodiments. The digital still camera also includes a solid-state image pickup element (photoelectric transducer) 22 such as a CCD sensor or a CMOS sensor incorporated in the camera main body, for receiving light of an image of a subject formed by the photographing optical system 21. The digital still camera also includes a memory 23 for recording information corresponding to the image of the subject, after photoelectric conversion performed by the solid-state image pickup element 22. The digital still camera also includes a finder 24 constituted of a liquid crystal display panel or the like, for observing the image of the subject formed on the solid-state image pickup element 22. In this way, by using the zoom lens system of the present invention for an image pickup apparatus such as the digital still camera, a small image pickup apparatus having high optical performance is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-229351, filed Oct. 1, 2009, which is hereby incorporated by reference herein in its entirety.

What is claimed is:

1. A zoom lens system, comprising, in an order from an object side to an image side:
  a first lens unit having positive refractive power;
  a second lens unit having negative refractive power;
  a third lens unit having positive refractive power;
  a fourth lens unit having negative refractive power; and
  a fifth lens unit having positive refractive power, wherein:
  the first lens unit, the second lens unit, the third lens unit, the fourth lens unit, and the fifth lens unit move during zooming so that an interval between the first lens unit and the second lens unit is larger at a telephoto end than that at a wide angle end, an interval between the second lens unit and the third lens unit is smaller at the telephoto end than that at the wide angle end, an interval between the third lens unit and the fourth lens unit varies, and an interval between the fourth lens unit and the fifth lens unit is larger at the telephoto end than that at the wide angle end; and
  the following conditions are satisfied:

$0.5 < |f2|/fw < 2.0;$ $-6.0 < M4/fw < -2.9;$ and $0.01 < (D34t - D34w)/fw < 1.50,$ where f2 denotes a focal length of the second lens unit, fw denotes a focal length of an entire system at the wide angle end, M4 denotes a movement amount of the fourth lens unit in zooming from the wide angle end to the telephoto end, D34w denotes an interval between the third lens unit and the fourth lens unit at the wide angle end, and D34t denotes an interval between the third lens unit and the fourth lens unit at the telephoto end.

2. A zoom lens system according to claim 1, wherein the following condition is satisfied:

$4.0 < f1/fw < 15.0,$ where f1 denotes a focal length of the first lens unit.

3. A zoom lens system according to claim 1, wherein the following condition is satisfied:

$1.0 < f3/fw < 3.0,$ where f3 denotes a focal length of the third lens unit.

4. A zoom lens system according to claim 1, wherein the following condition is satisfied:

$2.0 < |f4|/fw < 6.0,$ where f4 denotes a focal length of the fourth lens unit.

5. A zoom lens system according to claim 1, wherein the following condition is satisfied:

$3.0 < f5/fw < 7.0,$ where f5 denotes a focal length of the fifth lens unit.

6. A zoom lens system according to claim 1, wherein:
  the fourth lens unit is composed of one negative lens; and
  the following condition is satisfied:

$-0.7 < (R4a + R4b)/(R4a - R4b) < 0.9,$ where R4a denotes a curvature radius of a lens surface of the one negative lens on the object side and R4b denotes a curvature radius of a lens surface of the one negative lens on the image side.

7. A zoom lens system according to claim 1, wherein:
  the fourth lens unit is composed of one negative lens; and
  the following condition is satisfied:

$65 < \nu 4,$ where ν4 denotes an Abbe number of a material of the one negative lens.

8. A zoom lens system according to claim 1, wherein the following condition is satisfied:

$1.5 < (D45t - D45w)/fw < 6.0,$ where D45w denotes an interval between the fourth lens unit and the fifth lens unit at the wide angle end and D45t denotes an interval between the fourth lens unit and the fifth lens unit at the telephoto end.

9. An image pickup apparatus, comprising:
  the zoom lens system according to claim 1; and
  a solid-state image pickup element for receiving light of an image formed by the zoom lens system.

* * * * *